Jan. 28, 1941.  J. FALCON  2,230,140
OUTRIGGER OPERATING MECHANISM
Filed Nov. 20, 1939  2 Sheets-Sheet 1
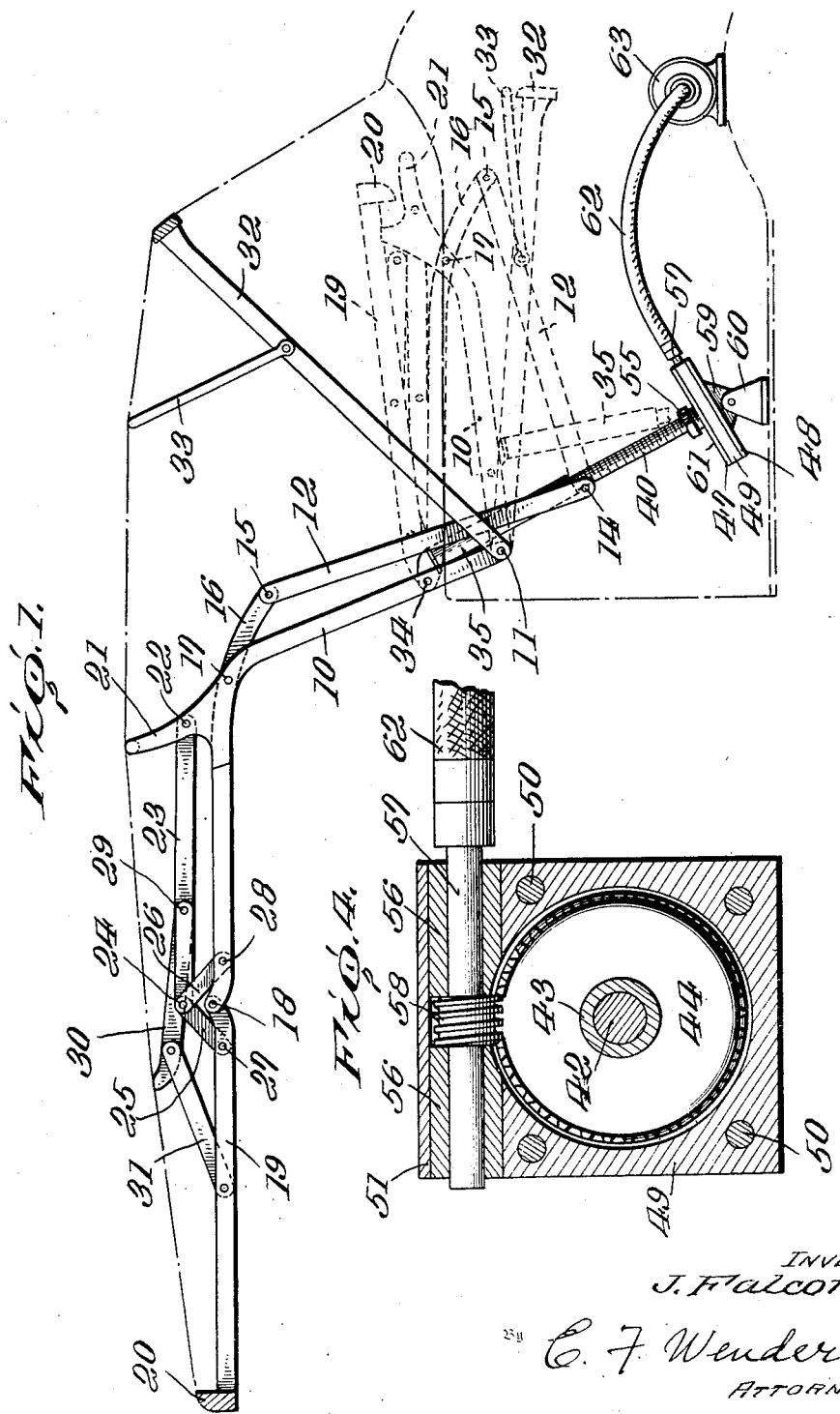
INVENTOR
J. Falcon
By C. F. Wenderoth
ATTORNEY

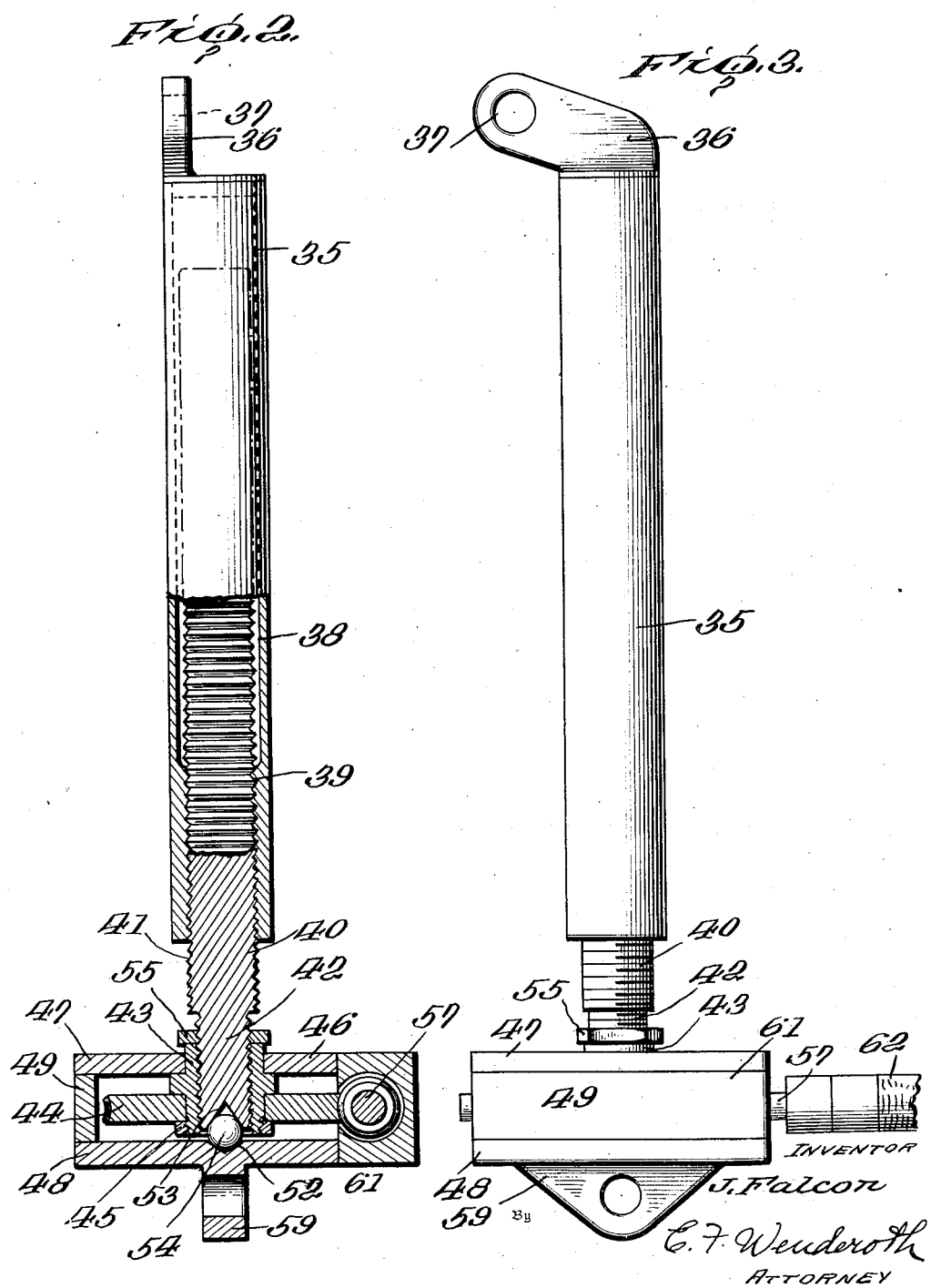

Patented Jan. 28, 1941

2,230,140

UNITED STATES PATENT OFFICE 2,230,140

OUTRIGGER OPERATING MECHANISM

Jeronimo Falcon, Buenos Aires, Argentina

Application November 20, 1939, Serial No. 305,349

3 Claims. (Cl. 296—117)

This invention relates to a new operating mechanism for outriggers used on vehicles of various types, particularly automobiles.

An object of the present invention is to provide means for operating a convertible top construction for an automobile or similar vehicle which will facilitate quick and easy conversion of an automobile from an open to a closed type and vice versa.

A further object of the invention is to provide a mechanism which is simple in form and efficient in operation so that the top may be easily and quickly manipulated by a single person between its extended and collapsed position with a minimum of effort.

A still further object of the invention is to provide a construction wherein sufficient power is available for efficiently and quickly extending and collapsing the outrigger.

A further object of the invention is to provide electrical means for operating the outrigger.

A still further object of the invention is to provide electrical means in which a reduction gearing is used so as to minimize the power required.

With this and other objects in view which will become apparent from the description below, the invention is shown in the drawings in which:

Figure 1 is a diagrammatic side elevation of a portion of the chassis of an automobile illustrating the general construction with the outrigger shown in extended position in full lines and in collapsed position in dotted lines.

Figure 2 is a partial cross-sectional view with portions shown in elevation of the reduction gearing operating cylinder and operating plunger.

Figure 3 is a side elevational view of the operating cylinder reduction gearing assembly and operating plunger, and Figure 4 is a horizontal cross-sectional view taken through the reduction gearing assembly.

Referring to the drawings in which similar reference characters are used throughout to indicate like parts in the various views, the outrigger assembly comprises the main standard 10 pivotally mounted in the body of the automobile at 11. It is understood that only one side of the motor car outrigger construction and operating mechanism therefor is shown in the drawings and that a similar construction is present at the other side of the automobile.

Extending substantially parallel to the standard 10 is an anchoring link 12 which is pivotally connected to the body of the automobile at 14 at one end and at the other end is pivotally connected at 15 to a link 16. The link 16 is pivotally connected intermediate it sends at 17 to the standard 10 and at its front end is pivotally connected at 18 to the forward link 19 which at its forward end is connected to the header 20 which is generally secured to the windshield of the automobile not shown.

The standard 10 has an upwardly extending projection 21 carrying a bow which extends across the top of the car in order to support the fabric. Pivotally connected at 22 to the projection 21 is the front control link 23 which at its other end is pivotally connected at 24 to the links 25 and 26 which in turn are pivotally connected to the forward link 19 and the link 16 at pivot points 27 and 28 respectively. The front control link 23 has pivoted thereto at 29 a bow 30 serving to support the fabric and also to fold it when the outrigger is collapsed. A link 31 pivoted at one end to the forward link 19 and at the other end of the bow 30 controls the operation of the bow 30.

32 indicates the rear bow and 33 indicates an auxiliary bow pivoted to the rear bow 32. The rear bow 32 is also pivotally mounted to the body of the automobile at 11.

Pivotally connected to the standard 10 at 34 is the operating cylinder 35 more particularly shown in Figures 2 and 3. The operating cylinder 35 at its upper end is provided with a lug 36 of the form shown in Figure 3 and an aperture 37 is provided in the lug 36 whereby the cylinder may be pivotally secured to the standard 10. The interior of the operating cylinder is for its major portion unthreaded and smooth as shown at 38 but at its lower portion adjacent the opening therein the cylinder is interiorly threaded as shown at 39. Cooperating with the threads 39 of the operating cylinder is a plunger 40 having threads 41 extending throughout the entire extent thereof.

The lower end of the operating plunger 40 is reduced so as to form the threaded connecting projection 42 which is secured to an interiorly threaded bearing sleeve 43. Secured to the bearing sleeve 43 is a spiral gear 44 which is secured in place by a lock nut 45 cooperating with exterior threads placed upon the lower end of the sleeve 43. The sleeve 43 is provided with an annular enlarged portion 46 which bears against the under surface of the top plate 47 placed above the spiral gear 44.

A bottom plate 48 is secured in spaced relation with regard to the top plate 47 by means of an intermediate plate 49. The top, bottom and intermediate plates are secured together by the rivets or bolts 50. The intermediate plate as shown more particularly in Figure 4 is provided with a central opening accommodating the spiral gear 44 and also with a bore 51 intersecting the central opening. The lower plate 48 is provided with a central conical seat 52 and the lower end of the operating plunger is also provided with a conical seat 53 and a plate bearing 54 is positioned in these seats. By operating the nut 55 threaded on the reduced portion of the operating plunger the sleeve 43 may be adjusted on the reduced portion so as to bear by means of its annular enlargement 46 against the under surface of the plate 47 with a minimum friction while at the same time preventing too great a play between such under surface and the annular enlargement 46. If desired, the spiral gear and associated parts may operate in oil or a lubricant of proper consistency.

Positioned in the bore 51 of the intermediate plate 49 which is enlarged at the location of the bore 51 as more particularly shown in Figure 2 are the bearings 56. Rotating in the bearings 56 is a shaft 57 carrying the worm gear 58 cooperating with the spiral gear 44.

The lower plate 48 is provided with a downwardly extending apertured lug 59 which is pivotally secured to a supporting bearing 60 fixed to the chassis of the automobile. The spiral gear 44 and the worm gear 58 together with their associated parts constitute a reduction gearing which is generally indicated in Figure 1 by 61. Connected to the shaft 57 is a flexible shaft 62 which at its other end is connected to the shaft of a double-ended reversible electric motor 63 which is mounted in any convenient location such as in the rear of the rear cushion of the automobile. The motor 63 is operated from the battery of the car by proper wiring and controlled from the instrument panel of the automobile. The flexible drive shaft 62 is of course encased in a proper housing.

Due to the reduction gearing used, the motor does not need to be of very high power. Furthermore the threading of the operating plunger also aids in reducing the size of the motor required.

It is, of course, obvious that in order to avoid the use of a special motor the flexible shaft 52 may be connected to a suitable point in the regular automobile transmission and in such case a clutch would have to be interposed so as to disconnect the operating mechanism when desired.

Various modifications may be made in the construction above set forth which is a construction at present preferred. Upon operating the motor 63 in one direction the rotation of the operating plunger will raise the operating cylinder 35 and when the direction of rotation of the motor is reversed then the operating plunger 40 will lower the operating cylinder 35. The raising and lowering of the operating cylinder will pivot the standard 10 about the pivot point 11 and the pivoting of the standard 10 will collapse or extend the various links above described and thereby extend the fabric over the automobile or collapse the fabric in the rear of the automobile.

I claim:

1. In a device for raising and lowering a folding vehicle top having stiff members incorporated in the top adapted to collapse upon each other and including a standard, in combination, means for elevating and lowering the standard comprising telescoping members having coacting means adapted to cause telescoping movement upon relative rotation thereof, one end of one of said members being secured to said standard and one end of the other of said members engaging a toothed driving member and having fixed coaxial relation therewith, a bracket upon which said telescoping means and said driving member are pivotally mounted, a source of power supply remote from said bracket, and driving means directly connecting said source of power supply and said driving member and having sufficient flexibility to compensate relative rocking movements therebetween.

2. In a device for raising and lowering a folding vehicle top having stiff members incorporated in the top adapted to collapse upon each other and including a standard, in combination, means for elevating and lowering the standard comprising telescoping members having coacting means adapted to cause telescoping movement as a result of relative rotation of the members, one end of one of said telescoping members being pivotally connected to said standard and being held against rotation thereby and the other end of the other member thereof being anchored to a gear for coaxial rotation therewith, said gear being rotatably mounted in a gear housing, a driving gear journalled in said housing engaging the first named gear, a source of power supply, said housing with its gears being rockably supported whereby said telescoping members are free to alter their position with respect to the vertical while elevating and lowering said standard, and flexible driving means connecting said source of power supply to said driving gear.

3. In a device for raising and lowering a folding vehicle top having stiff members incorporated in the top adapted to collapse upon each other and including a standard at each side of the vehicle, in combination, means for elevating and lowering each of said standards comprising telescoping members having coacting means adapted to cause telescoping movement upon relative rotation thereof, one end of said members engaging a driving member and having fixed coaxial relation therewith, a bracket at each side of the vehicle upon which said telescoping means and said driving member are pivotally mounted, said bracket sustaining the weight of said telescoping members, of said driving members and of the top to be elevated, a power means anchored to the vehicle and a flexible driving cable connecting said power means with the driving members for each of said standards whereby a single power means actuates the telescoping members during their extensible and retractible rocking movements.

JERONIMO FALCON.